June 15, 1926.
J. R. POWELL ET AL
1,588,807
HINGE FOR SPECTACLE MOUNTINGS
Filed April 25, 1924
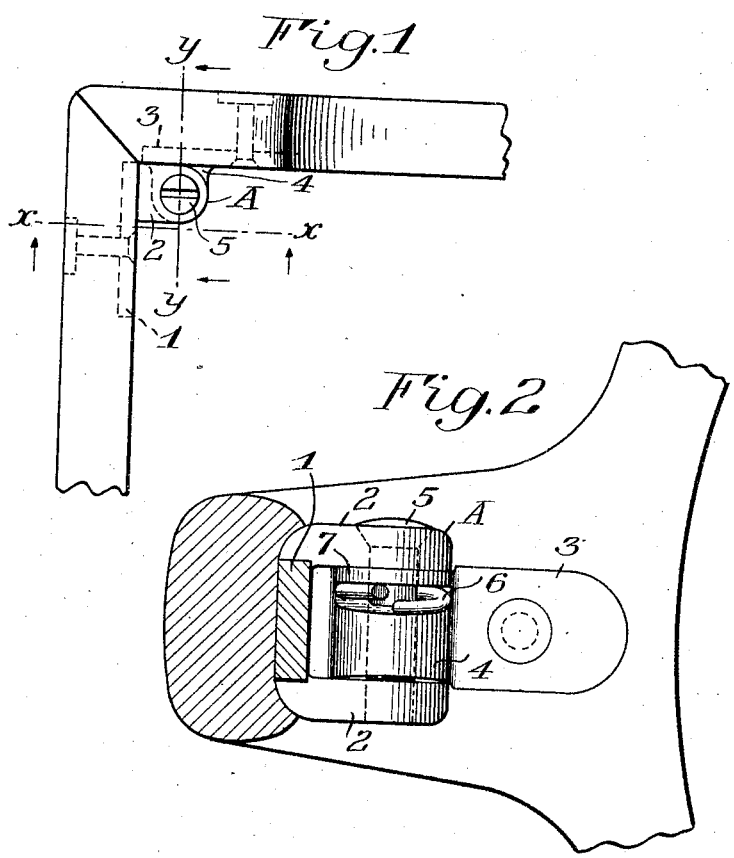
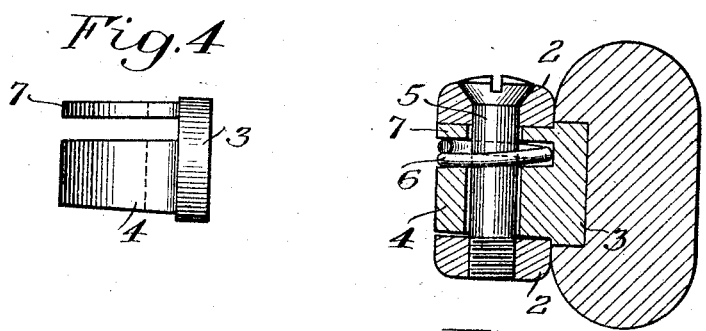
INVENTORS
John R. Powell
William Bausch
By
their ATTORNEY Patented June 15, 1926.

1,588,807

UNITED STATES PATENT OFFICE.

JOHN R. POWELL AND WILLIAM BAUSCH, OF ROCHESTER, NEW YORK, ASSIGNORS TO BAUSCH & LOMB OPTICAL COMPANY, OF ROCHESTER, NEW YORK, A CORPORATION OF NEW YORK.

HINGE FOR SPECTACLE MOUNTINGS.

Application filed April 25, 1924. Serial No. 708,869.

Heretofore in manufacturing spectacle mountings, some difficulty has been experienced in providing hinges for the attachment of the temples, which while affording sufficient strength would also be of such nature as to maintain the temple in adjusted position and to compensate for the wear of the parts so that they would not become loosened. This objection is particularly noticeable in spectacle mountings which are made of celluloid, zylonite, etc., and in which the hinges uniting the temples to the mounting carrying the lenses are relatively large. The invention consists in providing a hinge which has been found to be well adapted for this particular purpose and which is simple and cheap in construction. To these and other ends the invention consists in certain improvements and combinations of parts, all as will be hereinafter more fully described, the novel features being pointed out in the claims at the end of the specification.

In the drawings in which the parts are shown greatly enlarged,

Figure 1 is a plan view of a portion of the lens holding frame and a temple of a zylonite mounting;

Figure 2 is a section on the line x—x;

Figure 3 is a similar view on the line y—y;

Figure 4 is a side view of the hinge member showing the abutment on one hinge member when formed and slit.

Similar reference numerals throughout the several views indicate the same parts.

The hinge members for mountings of this description are usually made of a die casting of some suitable alloy which does not readily become tarnished. A represents one of the hinge members provided with a body or base 1 adapted for attachment to either the temple or the lens holding member and provided with perforated lugs 2, one having a recess for the head of the screw pintle 5 and the other threaded as usual. The other hinge member is provided with a similar base plate 3 and with a lug or abutment 4 adapted to extend between the lugs 2, the abutment being perforated for the passage of the securing screw or hinge pintle 5 and forming a relatively long bearing surface. In order to insure friction between the abutment and the lugs the abutment is slotted near one end and a split spring ring or washer 6 is inserted in this slot, the pintle passing through its center and holding it in position. The free ends of this ring or washer are slightly separated laterally or in the direction of the length of the pintle so that the portion of the abutment forms a perforated ear indicated by 7 that is more or less yielding and is adapted to be forced against the adjacent lug with sufficient spring pressure to afford friction between the hinge members and prevent their movement upon each other excepting by the exercise of slight force. Inasmuch as the member carrying the abutment is preferably made of a die casting, and it is desirable that the casting be removable from the mold in which it is formed, the ends or at least one end of the abutment is formed with a very slight taper as shown in Figure 4, and the spring ring or washer which is inserted in the slot will force and keep the thinner portion 7 of the abutment in frictional engagement with the lug on the outer hinge member with the engaging surfaces substantially parallel and thereby afford a friction surface sufficient for the purposes in a device of this nature.

Although it is preferable, it is not absolutely essential that the two surfaces of the abutment which engage the lugs be out of parallelism when formed, and before the insertion of the elastic washer, this construction is desirable in order that when the washer is inserted the free ends of the spring washer wear may be distributed evenly.

The employment of the abutment with the integral thin portion which forms the friction surface, is particularly advantageous when the hinge pintle is a removable screw, as the spring being out of contact with the screw the latter is not liable to be turned or loosened by the relative movement of the hinge members, and furthermore there are no sharp cutting edges on the relatively movable parts.

We claim as our invention:

1. A hinge for spectacle mountings comprising two members and a pintle, one of said members having perforated lugs thereon, the other member having a longitudinally perforated abutment and a thin perforated ear thereon both arranged between the lugs of the other member, and a spring washer encircling the pintle and located between the perforated lug and the abutment.

2. A hinge for spectacle mountings comprising two members and a pintle, one of said members having the perforated lugs thereon, the other member having a longitudinally perforated abutment and a yielding perforated ear at one end and arranged between the lugs on the other member and a spring washer arranged between the abutment ear on the last mentioned member.

3. A hinge spectacle mounting comprising two members and a pintle, one member having perforated lugs thereon, the other member having a relatively long bearing portion for the pintle and a yielding ear at one end, and a spring washer arranged beneath the ear.

4. A hinge for spectacle mountings comprising two members and a screw pintle connecting them, one member having perforated lugs thereon, the other member having an abutment slotted near one end and forming a perforated yieldable ear, and a spring washer arranged in the slot.

JOHN R. POWELL.
WILLIAM BAUSCH.